March 1, 1955  J. J. GODBEY  2,702,961
FISHING LURE

Filed Oct. 26, 1951  2 Sheets-Sheet 1

INVENTOR.
JOSIAH J. GODBEY
BY Melvin C. Flint
    Attorney

March 1, 1955  J. J. GODBEY  2,702,961
FISHING LURE

Filed Oct. 26, 1951  2 Sheets-Sheet 2

INVENTOR.
JOSIAH J. GODBEY
BY *Melvin C. Flint*
*Attorney*

United States Patent Office 2,702,961
Patented Mar. 1, 1955

2,702,961

FISHING LURE

Josiah J. Godbey, Dallas, Tex.

Application October 26, 1951, Serial No. 253,429

4 Claims. (Cl. 43—35)

This invention relates to fishing lures, and is concerned more particularly with improvements therein designed to prevent the hooks thereof from becoming entangled in weeds, brush, and the like during actual fishing operations.

More specifically, it is one object of this invention to provide such a lure wherein the hooks may be releasably secured within the slots in the lure body while the lure is being cast and also while it is being towed through the water and wherein the hooks will be released and sprung into operative position only by the thrust of a fish on the trigger of the lure in the direction in which the lure normally is towed, whereby there is no danger of the hooks becoming entangled in clothing, trees, bushes, weeds, and the like during the entire fishing operation.

Another object of this invention is to provide such a lure in which the hook elements may be tripped or released from their retracted positions in the slots within the lure body only by a forward thrust, in the direction in which the lure normally is towed, on a trigger provided in the body of the lure, whereby the lure may be cast and towed through the water without danger of the barbs of the hook elements becoming tangled in weeds, brush, and other objects in or under the water, but at the same time the hook elements will be thrust into operative position when a strike is made upon the lure by a fish.

Another object of this invention is to provide a lure in which the hooks thereof are normally releasably enclosed within the body of the lure, thus enabling the body of the lure to give a provocative motion when towed through the water without the hooks interfering with said motion.

A still further object of the invention is the provision of a fishing lure having the above described features without detracting from the efficiency or fish-catching potentialities thereof.

Other objects and features of the invention will be apparent from the following detailed description and appended drawings.

Referring to the drawings, wherein like characters indicate like parts throughout the several views.

Figure 1:
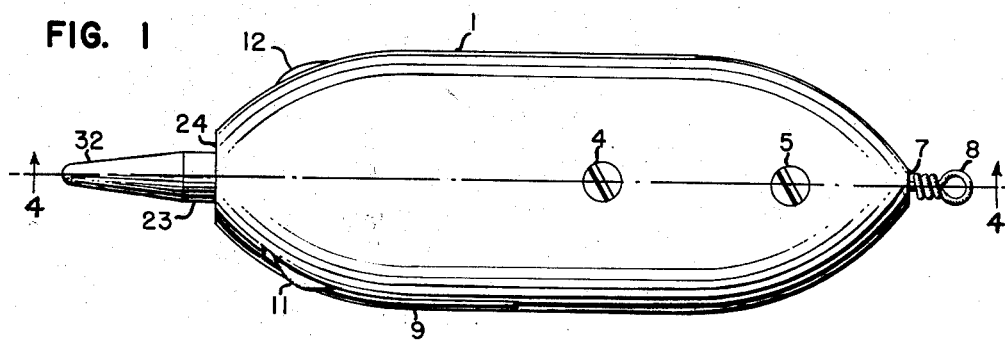
Figure 1 is a side elevation of the novel lure, constructed according to the invention and, for purposes of simplicity, with the only one hook element shown and that one in retracted or releasable secured position within the slot in the lure body.

Referring now to the structure shown in the drawings, numeral 1 indicates generally a substantially ellipsoidal, hollow lure body composed preferably of two shells 2 and 3 (Figure 4) secured together by means of a pair of screws 4 and 5 or similar devices such as rivets or eyelets. For reasons mentioned below, the screws are disposed in substantially parallel relation, one screw 4 being located preferably approximately at the center of lure body 1 and the other screw 5 adjacent the tow end thereof. Wire 6 secured to screw 5 extends through the tow end of body 1 as at 7 and terminates in tow eye 8, by means of which the lure may be cast and towed.

Provided in each of shells 2 and 3 is a longitudinal slot, such as slots 9 and 10 (Figure 6), communicating with the interior of lure body 1 and adapted to permit alternate retraction of the barb ends of hook elements 11 and 12, respectively, into, and extension of them to fish-catching position from, lure body 1, in the manner below described. Each of the hook elements 11 and 12 is secured by welding, embedding, or in other suitable manner, as most clearly shown in Figure 5, in a hook element disc, such as discs 13 and 14, respectively.

Figure 3:
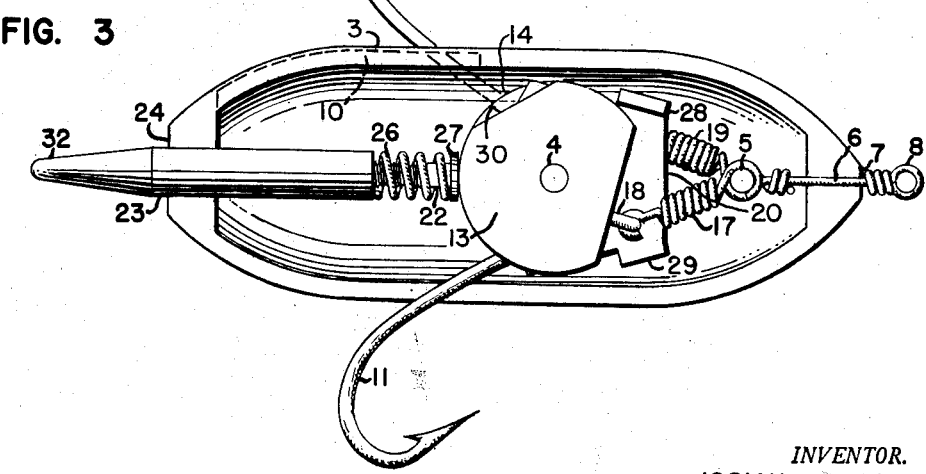
Figure 3 is a side elevation of the lure similar to Figure 2 except that the hook elements and associated parts are shown in fish-catching position.

Hook element discs 13 and 14 are provided with suitable apertures 15 and 16, respectively (Figure 5) for receiving screw 4, whereby hook element discs 13 and 14 are pivotally mounted in lure body 1 in a manner so as to permit the barb portions of the hook elements to pass freely into and out of body 1 through the longitudinal slots in the lure body, as shown. A spring 17 or other suitable resilient means is connected to screw 5 and to one side of hook element disc 13 by means of eye 18 in a manner to normally urge hook element disc to fish-catching position, as shown in Figure 3. Similarly, hook element disc 14 is normally urged to fish-catching position by spring 19 connected to screw 5 and to disc 14, as shown.

Figure 4:
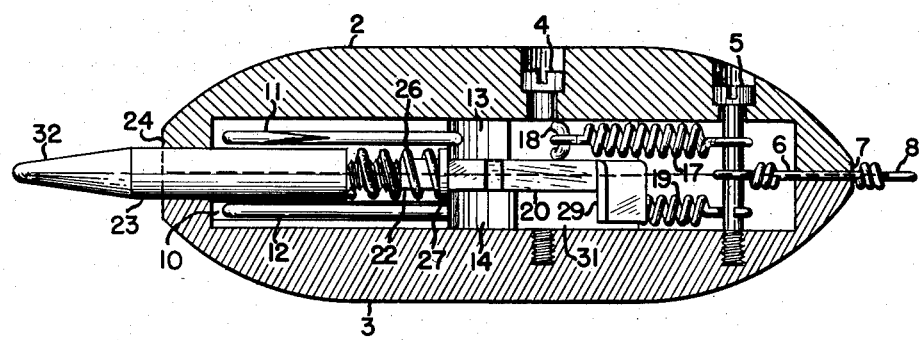
Figure 4 is a longitudinal section on the line 4—4 of Figure 1, the mechanism within the body being shown in full.

Within lure body 1 and between hook element discs 13 and 14, there is disposed detent plate 20 having an elongated aperture 21 (Figure 5) provided therein through which screw 4 extends to secure detent plate 20 in position. The purpose of the elongated aperture is pointed out hereinafter. From one edge of detent plate 20 extends threaded stud 22. An elongated trigger 23 extends from outside lure body 1 through a suitable opening in the drag or tail end thereof, as at 24, and is connected by cooperating internal threads 25 (Figure 5) with threaded stud 22. Threaded stud 22 is located on detent plate 20 at a point such that the axis of threaded stud 22 is substantially aligned with the longer diameter of elongated aperture 21. Thus, it will be seen that limited lateral movement of detent plate 20 may be brought about by corresponding longitudinal movement of trigger 23. However, trigger 23 is normally urged to its furthermost position away from the tow end 7 of the lure by the force of trigger spring 26 positioned about threaded stud 22 and compressed, as shown in Figure 4, between the end of trigger 23 and trigger spring washer 27, mounted for slidable movement on stud 22 the latter in turn abutting hook element discs 13 and 14. The force required to move detent plate 20 toward the tow end 7 of the lure against the force of trigger spring 26 may be controlled by threading trigger 23 on or off threaded stud 22.

Figure 2:
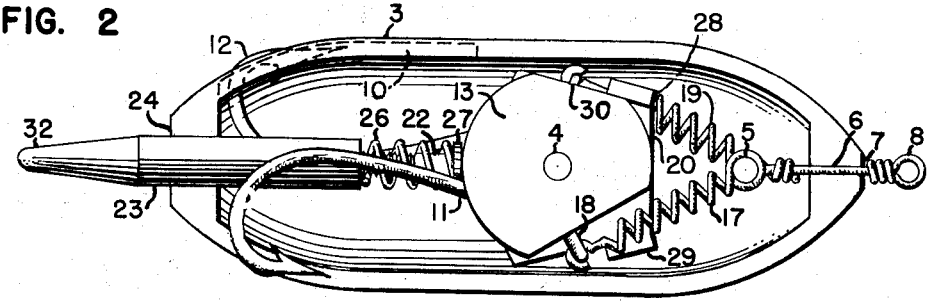
Figure 2 is a side elevation of the lure with the cover half or section removed.
Figure 5:
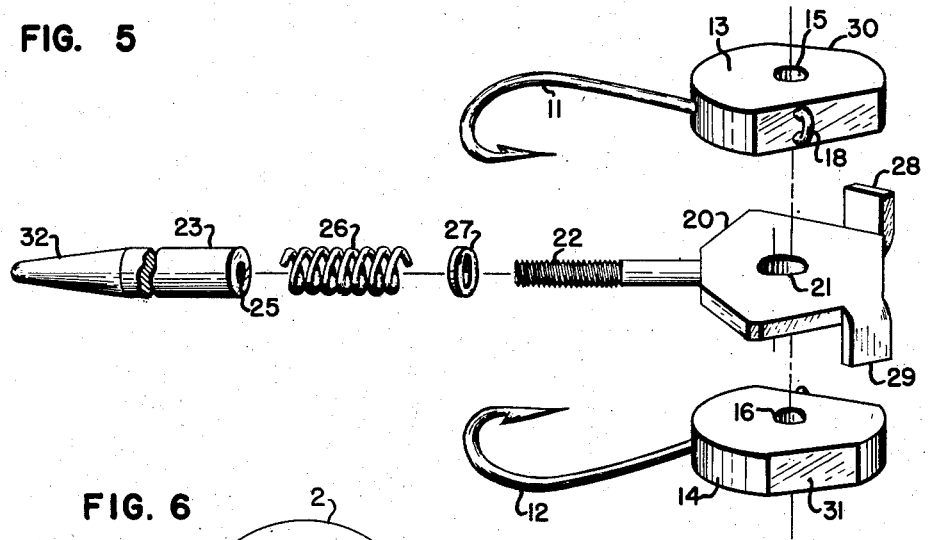
Figure 5 is an exploded perspective view of the detent plate, hook element discs, trigger and trigger spring of the lure shown in Figure 4.
Figure 6:
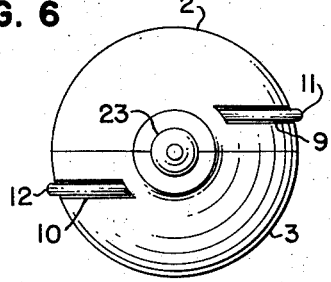
Figure 6 is a rear elevation of the line.

On the side of detent plate 20 opposite threaded stud 22, there are provided, as shown in Figure 5, detents 28 and 29 extending laterally outward from opposite faces thereof. Detents 28 and 29 are formed and positioned in a manner so as to engage beveled surface 30 of hook element disc 13 and beveled surface 31 of hook element disc 14, respectively, when the hook elements are in retracted position within lure body 1, as shown in Figure 2, whereby the hook elements are releasably secured within the lure body. The hook elements will be maintained in such retracted position until a thrust, such as that from the strike of a fish, on trigger 23 causes detent plate 20 to move toward the tow end of the lure, thereby disengaging the detents 28 and 29 and the associated hook element discs 13 and 14, respectively.

It is to be noted that hook element discs 13 and 14 not only function to anchor hook elements 11 and 12 and to provide beveled surfaces 30 and 31 for the triggering mechanism, but in addition stabilize the hook elements against lateral movement, since the hollow body is formed so as to first accommodate hook element discs 13 and 14, and detent plate 20.

In setting the lure, the fisherman need only press with his fingers just behind the barbs of the hook elements until the hook elements are substantially entirely within the lure body, such as shown in Figures 1 and 2. As the hook elements are pivoted to retracted position in the lure body the hook element discs bear against the associated detents 28 and 29 causing detent plate 20 to move toward the tow end of the lure until the detents 28 and 29 slide over the ends of the hook element discs and snap under the force of trigger spring 26 on beveled surfaces 30 and 31, respectively, of the hook element discs. The hook elements thus will be releasably secured in retracted position and the lure is ready for casting.

It is preferable to taper the end of trigger 23 as at 32 so that the force of the lure striking the water will not prematurely trip the lure. The hook elements will remain in retracted position while the lure is cast and is towed through the water and until a fish strikes at the lure. When the force required to trip the hook elements has been properly adjusted by threading trigger 23 on or off threaded stud 22, as described above, the force of a fish striking the trigger causes detent plate to be displaced toward tow end 7, disengaging detents 28 and 29 and the associated hook element discs 13 and 14, respectively. Hook elements 11 and 12 then are caused by the force of springs 17 and 19, respectively, to pivot into fish-catching position within the mouth of the fish. As is well known to those skilled in the art, many types of fish strike lures and the like rather violently and in the case of the novel lure of this invention as the fish thus takes the lure closing his mouth thereon, its teeth or other internal part pushes forwardly or inwardly on trigger 23 causing the trigger to move slightly relative to lure body 1, thus actuating the hook elements. The tension on the trigger is such that only a slight pressure thereon by the teeth or other internal part of the fish, while the lure body is held in its mouth, will so trip the lure. In those cases where the lure does not trip at the time the fish first strikes the lure, any subsequent manipulation by the fish while the lure remains in the mouth of the fish should be sufficient to trip the lure. Since the hooks are pivotally mounted within the body, as the fish tries to expel the lure by pulling away, the hooks are pulled back thereby taking a better set within the mouth of the fish.

While the preferred form of the invention has been shown and described, it is to be understood that minor modifications and changes may be made therein without departing from the spirit and scope of the invention as defined by the appended claims. For example, the lure body may be of some other shape than ellipsoidal, such as cylindrical or flat; or again the lure may be provided with more than two hooks.

I claim:

1. A fishing lure comprising an elongated hollow body having a tow end and a drag end and having longitudinal slots in the sides communicating with the interior thereof, hook elements associated with each of said slots, separate hook element mounting means connected to each of said hook elements and pivotally mounted within said body in a manner permitting movement of said hook elements alternately into and out of said body through the associated slots, resilient means normally urging said hook elements out of said body, trigger means extending from within said body to a point beyond said drag end and mounted for movement longitudinally of said body, detent means connected to the inner end of said trigger means and adapted, when said trigger means is in one position, to engage each said mounting means to hold said hook elements within said body and, when said trigger means is moved longitudinally inwardly from said one position, to release each said mounting means, permitting portions of said hook elements to move out of said body under the force of said resilient means.

2. The fishing lure of claim 1, wherein there is provided a second resilient means under compression normally urging said detent means into releasable engagement with each said mounting means.

3. The fishing lure of claim 2, wherein there are provided means for adjusting said second resilient means whereby to vary the force necessary to move said trigger means from said one position and permit said hook elements to move out of said body.

4. The fishing lure of claim 1, wherein each of said mounting means comprises a disc having a beveled surface adapted to co-operate with said detent means.

References Cited in the file of this patent

UNITED STATES PATENTS

| 1,571,770 | Fenner | Feb. 2, 1926 |
| 2,044,702 | Kalyu | June 16, 1936 |
| 2,079,509 | Kettring | May 4, 1937 |